US012726477B1

(12) United States Patent
Fitzgerald et al.

(10) Patent No.: US 12,726,477 B1
(45) Date of Patent: Sep. 1, 2026

(54) AUDIO AUTHENTICATION FOR DIGITAL TELEPHONY

(71) Applicant: Zoom Video Communications, Inc., San Jose, CA (US)

(72) Inventors: Derrick John Fitzgerald, Woodstock, GA (US); David Chei Seong Yap, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 146 days.

(21) Appl. No.: 18/382,277

(22) Filed: Oct. 20, 2023

(51) Int. Cl.

| | |
|---|---|
| ***H04L 9/40*** | (2022.01) |
| ***G10L 15/02*** | (2006.01) |
| ***G10L 17/04*** | (2013.01) |
| ***G10L 17/18*** | (2013.01) |
| ***H04L 65/65*** | (2022.01) |
| ***H04M 3/493*** | (2006.01) |
| ***H04M 7/00*** | (2006.01) |

(52) U.S. Cl.
CPC .......... *H04L 63/0861* (2013.01); *G10L 15/02* (2013.01); *G10L 17/04* (2013.01); *G10L 17/18* (2013.01); *H04L 63/0428* (2013.01); *H04L 65/65* (2022.05); *H04M 3/493* (2013.01); *H04M 7/006* (2013.01)

(58) Field of Classification Search
CPC . H04L 63/0861; H04L 63/0428; G10L 15/02; G10L 17/04; G10L 17/18; H04M 3/493; H04M 7/006
USPC .......................................................... 713/186
See application file for complete search history.

(56) References Cited

U.S. PATENT DOCUMENTS

| | | | | |
|---|---|---|---|---|
| 9,940,934 | B2 * | 4/2018 | Sachdev | G10L 17/02 |
| 10,593,336 | B2 * | 3/2020 | Boyadjiev | G10L 17/22 |
| 10,652,238 | B1 * | 5/2020 | Edwards | H04L 63/102 |
| 10,867,021 | B1 * | 12/2020 | Shelton | G10L 17/24 |
| 10,956,907 | B2 * | 3/2021 | Parnell | G06Q 20/20 |
| 11,100,739 | B1 * | 8/2021 | Mathew | G07C 9/257 |
| 12,189,739 | B2 * | 1/2025 | Williams | G06F 21/32 |
| 2005/0096906 | A1 * | 5/2005 | Barzilay | G10L 15/26 704/E15.045 |
| 2012/0204035 | A1 * | 8/2012 | Camenisch | G06F 21/32 713/186 |
| 2012/0253810 | A1 * | 10/2012 | Sutton | G10L 17/24 704/E15.001 |

(Continued)

*Primary Examiner* — Dant B Shaifer Harriman
(74) *Attorney, Agent, or Firm* — Kilpatrick Townsend & Stockton LLP

(57) ABSTRACT

Techniques for audio authentication for digital telephony are disclosed. In an example method, a computing device receives a user voice sample. The computing device determines one or more user voice features from the user voice sample and generates a user voice model based on the one or more user voice features. Next, the computing device receives, from a client device, first authentication information including an authentication voice sample. The computing device again determines one or more authentication voice features from the authentication voice sample and generates an authentication voice model based on the one or more authentication voice features. The computing device then determines a difference between the user voice model and the authentication voice model. In response to the difference being less than a predetermined threshold, the computing device outputs, to the client device, an authentication grant.

20 Claims, 9 Drawing Sheets

(56) References Cited

U.S. PATENT DOCUMENTS

| | | | | |
|---|---|---|---|---|
| 2015/0249664 | A1* | 9/2015 | Talhami | H04L 63/0861 726/6 |
| 2016/0277439 | A1* | 9/2016 | Rotter | H04L 63/0861 |
| 2016/0353282 | A1* | 12/2016 | Richards | H04W 12/068 |
| 2018/0004925 | A1* | 1/2018 | Petersen | G10L 17/04 |
| 2018/0096354 | A1* | 4/2018 | Kohli | G06F 21/32 |
| 2021/0193174 | A1* | 6/2021 | Enzinger | G10L 17/00 |
| 2021/0328801 | A1* | 10/2021 | Sly | G06N 3/0464 |
| 2022/0116388 | A1* | 4/2022 | Johnson | G10L 25/72 |
| 2022/0270611 | A1* | 8/2022 | Tuo | G06N 20/20 |
| 2022/0277070 | A1* | 9/2022 | Robert Jose | G06F 21/45 |
| 2023/0041266 | A1* | 2/2023 | Earman | G06N 3/084 |
| 2023/0081988 | A1* | 3/2023 | Chung | H04L 9/14 713/186 |
| 2023/0161853 | A1* | 5/2023 | Nair | G10L 17/06 726/18 |
| 2024/0236086 | A1* | 7/2024 | Traywick | H04L 63/0861 |
| 2024/0428101 | A1* | 12/2024 | Smith | G06N 20/00 |
| 2025/0005123 | A1* | 1/2025 | Goel | G06F 21/32 |

* cited by examiner

RECEIVE A USER VOICE SAMPLE
702

DETERMINE ONE OR MORE USER VOICE FEATURES FROM THE USER VOICE SAMPLE
704

GENERATE A USER VOICE MODEL BASED ON THE ONE OR MORE USER VOICE FEATURES
706

RECEIVE, FROM A CLIENT DEVICE, FIRST AUTHENTICATION INFORMATION COMPRISING AN AUTHENTICATION VOICE SAMPLE
708

DETERMINE ONE OR MORE AUTHENTICATION VOICE FEATURES FROM THE AUTHENTICATION VOICE SAMPLE
710

GENERATE AN AUTHENTICATION VOICE MODEL BASED ON THE ONE OR MORE AUTHENTICATION VOICE FEATURES
712

DETERMINE A DIFFERENCE BETWEEN THE USER VOICE MODEL AND THE AUTHENTICATION VOICE MODEL
714

RESPONSIVE TO THE DIFFERENCE BEING LESS THAN A PREDETERMINED THRESHOLD, OUTPUTTING, TO THE CLIENT DEVICE, AN AUTHENTICATION GRANT
716

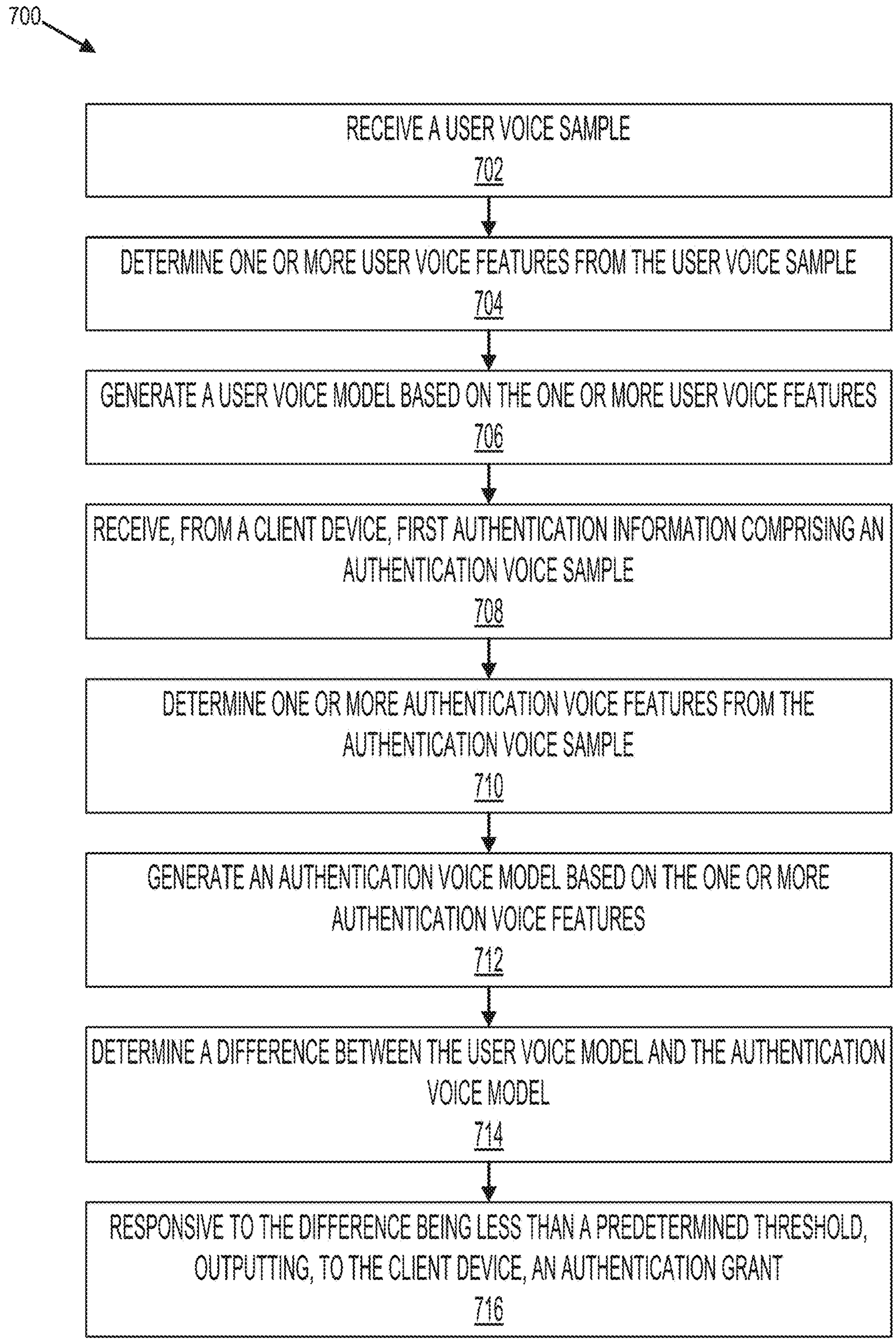

FIG. 7

AUDIO AUTHENTICATION FOR DIGITAL TELEPHONY

FIELD

The present application generally relates to digital security, and more particularly relates to techniques for audio authentication for digital telephony.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 shows a flowchart of an example method for audio authentication for digital telephony, according to some aspects of the present disclosure.

DETAILED DESCRIPTION

Figure 1:
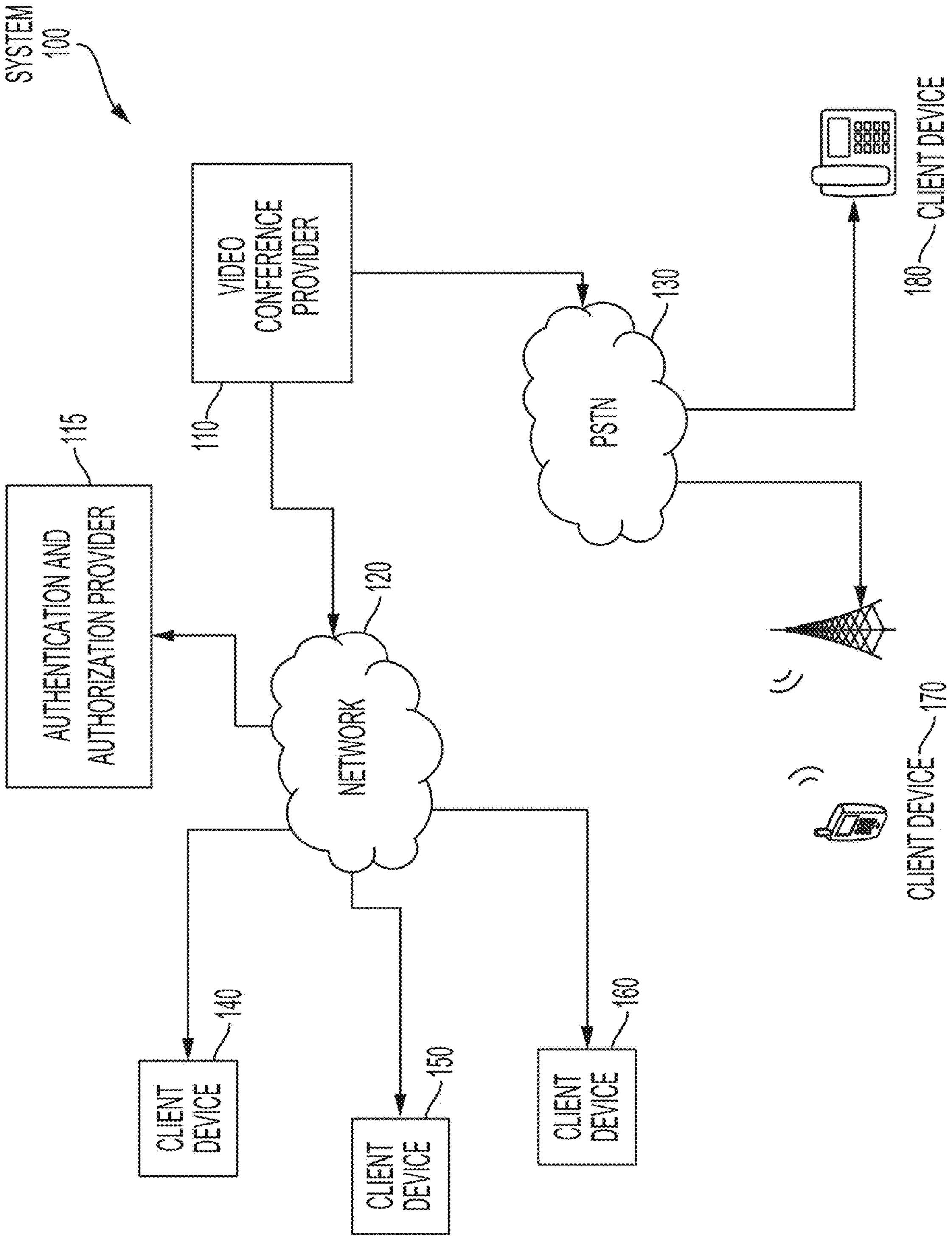
FIG. 1 shows an example system that provides videoconferencing functionality to various client devices, according to some aspects of the present disclosure.

Examples are described herein in the context of techniques for audio authentication for digital telephony. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing and digital telephony are two pillars of modern personal and enterprise communication. As these technologies become more ubiquitous, so too do their varied use cases proliferate. One use case involves the sharing of network resources. For example, some workplaces organized as co-working or hybrid workspaces may provide options for hoteling or "hot-desking." Hoteling and hot-desking both generally refer to a shared, temporary desk that may include network resources such as laptops, desktops, tablets, internet protocol (IP) phones, and so on. Another typical use case involves conference phones as may be found in a meeting or conference room. Such phones are also examples network resources that may be frequently shared among multiple users.

The sharing of network resources presents a logistical challenge. For instance, sharing physical network devices such as IP phones may require careful planning due to a limited number of such devices. Another challenge stemming from that arrangement relates to securing network resources. Access to shared network resources is typically secured to prevent unauthorized use, to protect the privacy and confidentiality of users, and to monitor usage to conserve bandwidth and cost, among other reasons. For example, access to physical devices such as laptops and tablets are familiarly secured using passwords. Likewise, an IP phone may require the user to enter a personal identification number (PIN), password, or use a hardware authentication device prior to each use.

Considering the example of the IP phone, the existing methods for authenticating or authorizing use of such shared resources, particularly in a shared workspace, are cumbersome and outdated. For example, existing systems may require IP phone users to enter account numbers, PINs, emails, activation codes, etc. prior to each use. Because the shared IP phone may be deactivated and not physically secured after each use, the authenticated session may not persist. In the context of the rapid pace of modern communications and multitasking, the requirement for repetitive authentication can lead to a poor user experience, seeking of alternative means of communication, or workarounds leading to effectively lax security.

To provide rapid authentication that can easily be used repetitively in environments such as a shared working space, techniques for audio authentication for digital telephony are provided. In an exemplary method, configuration of voice-based authentication begins with a video conference provider receiving a user voice sample. In this example, a user sits at a shared desk in a co-working space. The shared desk comes with an IP phone that is provided by the operator of the co-working space, but the IP phone requires authentication to use. The IP phone may require a voice sample upon first use to configure the authentication process, such as particular phrase or sentence to be spoken one or more times. For instance, upon initiating a conference call in a conference room or meeting room, the IP phone may require the user initiating the meeting to submit a voice sample.

The video conference provider, upon receipt of the voice sample, determines one or more voice features from the user voice sample. Voice features may include various aspects of recorded speech such as pitch, tone, or speed, that can be extracted from the voice sample. The voice features of the voice sample can be extracted using algorithmic digital signal processing (DSP) techniques. Based on the extracted voice features, the video conference provider generates a user voice model based on the voice features. The user voice model is a collection of extracted voice features that characterizes the user's voice. For instance, the voice model may include the directly measured features previously mentioned such as pitch, tone, or speed. In addition, the user voice model may include inferred or derived features such as coefficients of a mathematical model.

With the user voice profile generated and stored, the IP phone can be used for authentication. In an example authentication session, the video conference provider receives, from a client device, such as the IP phone, authentication information including an authentication voice sample. For example, upon attempting to use the IP phone as configured above, the user may hear a prompt such as "After the beep, please repeat the following phrase: my voice is my password." The user then vocalizes the given passphrase which is output to the video conference provider along with appropriate metadata such as identification of the device.

The video conference provider again, upon receipt of the authentication voice sample, determines one or more voice features from the user voice sample. The determination of features is similar to the process used when the initial voice sample was received. The video conference provider uses the determined features to generate an authentication voice model.

The generated authentication voice model is suitable for comparison with the user voice model developed during the initial configuration stage. For example, consider a simple example of a voice model that includes numerical measures of pitch, tone, and speed. The video conference provider can compare the user voice model and the authentication voice model to determine a numerical measure of their difference corresponding to a probability that they come from the same source.

In some examples, the accuracy of the comparison can be improved through the application of artificial intelligence (AI) or machine learning (ML) technologies to the problem of comparison. One example ML model can be trained to classify a particular voice model as having the same source as another. Likewise, another example ML model can be trained to output a probability that a particular voice model has the same source as another. Various ML model configurations, alone and in combination can be used for this task.

In all cases, the video conference provider can be configured to determine a numerical measure of the difference between the sample and the baseline voice models. If the difference is less than a predetermined threshold, then the video conference provider outputs, to the client device, an authentication grant. For example, the video conference provider may generate an ephemeral authentication token that can be used by the IP phone to accompany network requests for the duration of a session. Or the video conference provider may provision telephony services to the IP phone directly, now that it has been successfully authenticated.

The innovations of the present disclosure provide significant improvements in the technical field of digital security. The techniques disclosed herein provide a particular computerized method for voice-based authentication over digital telephony devices and other network resources. For instance, digital telephones, such as IP phones, typically include conventional means for authentication. Using the techniques herein, voice-based authentication can be used in concert with ML models to validate voice samples to provide rapid, frictionless authentication that is an increasingly important component of modern workflows.

Moreover, the techniques disclosed herein improve the functioning of digital telephony devices and other network resources. As described above, typical methods for authentication using certain telephony devices and other network resources involve clumsy operations such as entry of PINs or passwords using a keypad in response to slow, menu-driven responses from an interactive voice response (IVR). With the techniques disclosed herein, after initial configuration, authentication can be performed more quickly with potentially reduced error rates due to mis-typed PINs or passwords. Error rates may be further reduced through the use of ML models to compare voice models, as compared with some existing systems. Consequently, the consumption of processing resources and memory resources may be reduced.

These illustrative examples are given to introduce the reader to the general subject matter discussed herein and the disclosure is not limited to these examples. The following sections describe various additional non-limiting examples techniques for audio authentication for digital telephony.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
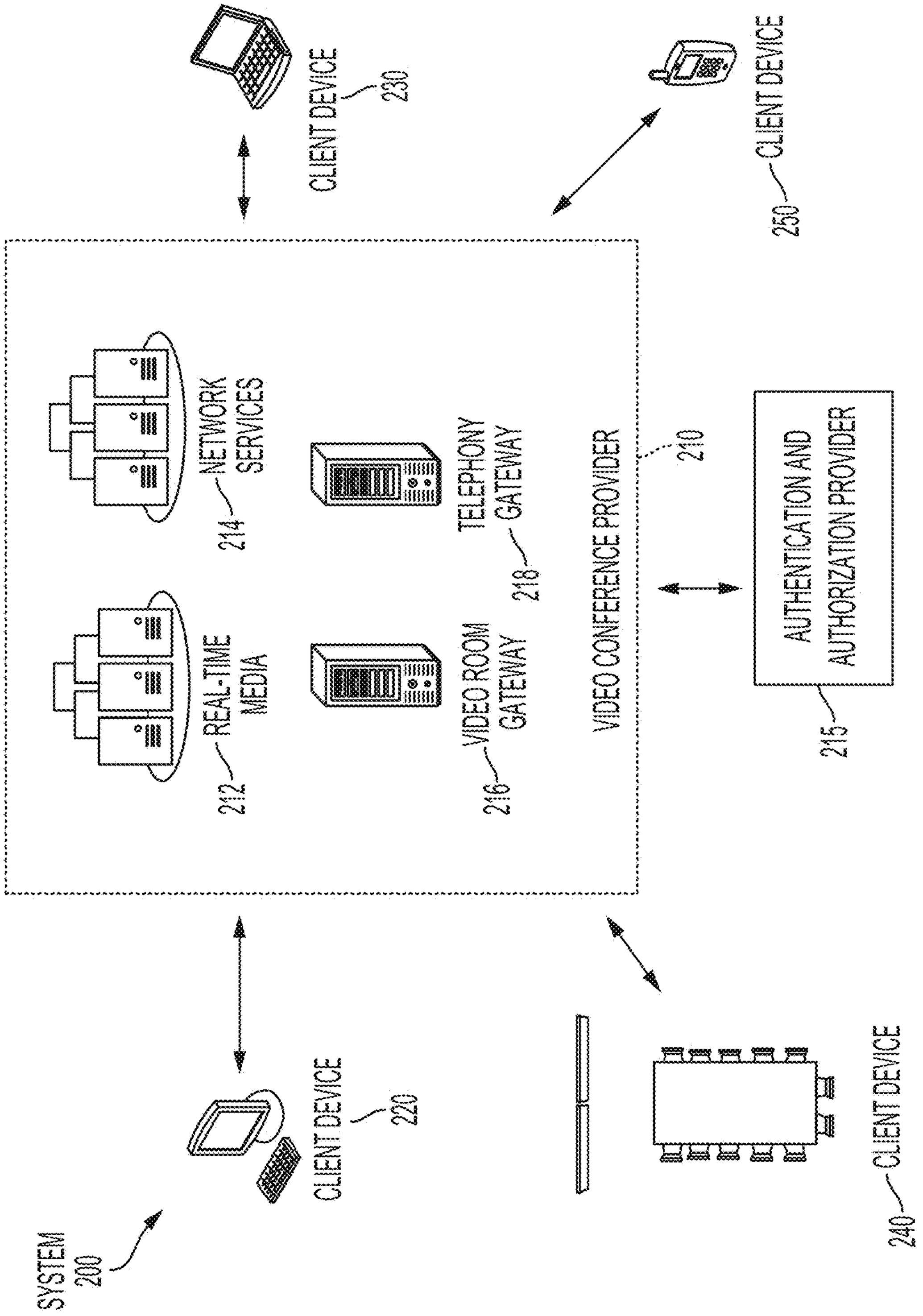
FIG. 2 provides a more detailed description of the architecture and functionality of the chat and video conference provider, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
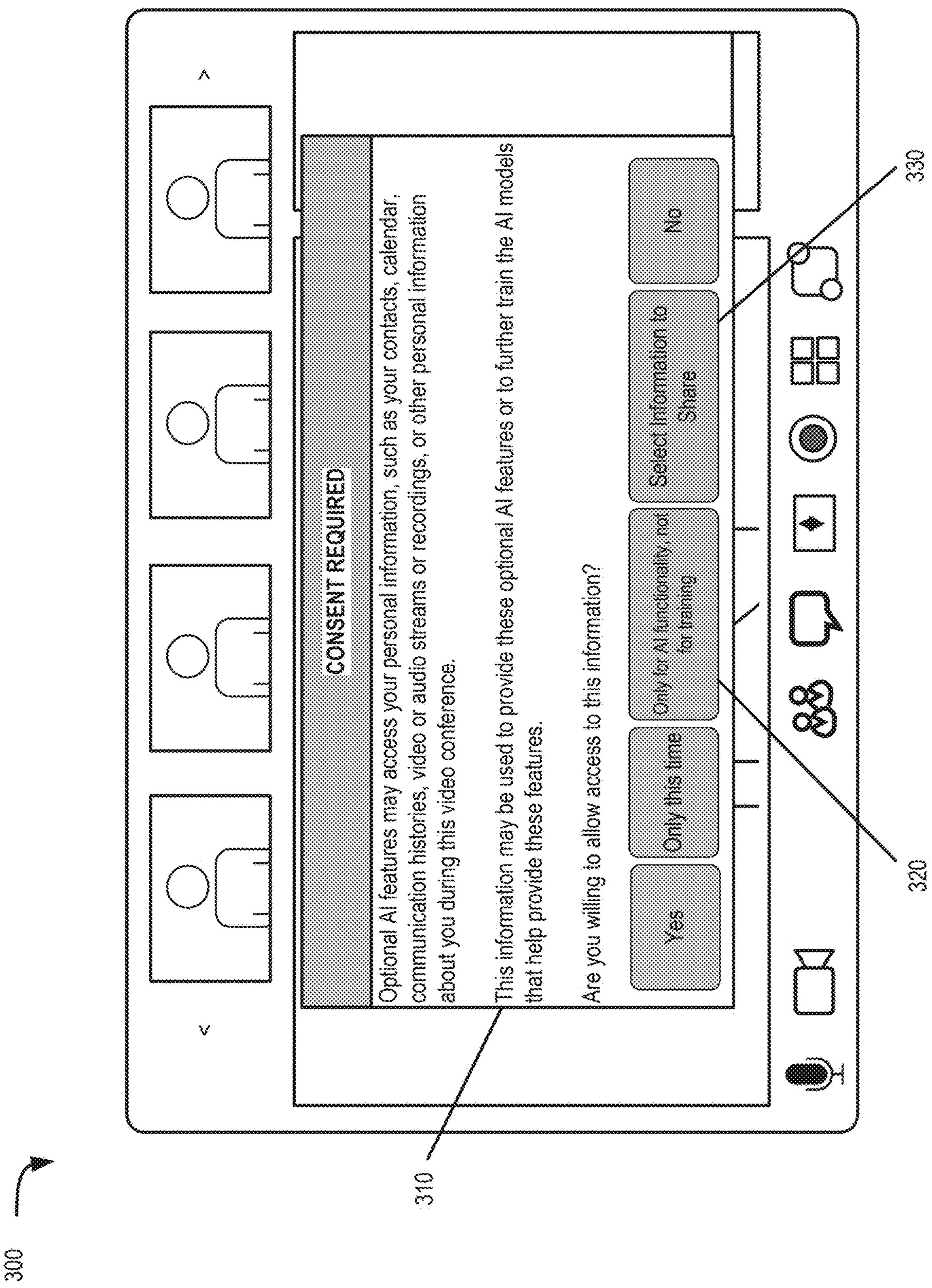
FIG. 3 shows an example user interface that may be used in some example systems configured for audio authentication for digital telephony, according to some aspects of the present disclosure.

Turning next to FIG. 3, FIG. 3 shows an example user interface 300 that may be used in some example systems configured for audio authentication for digital telephony. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
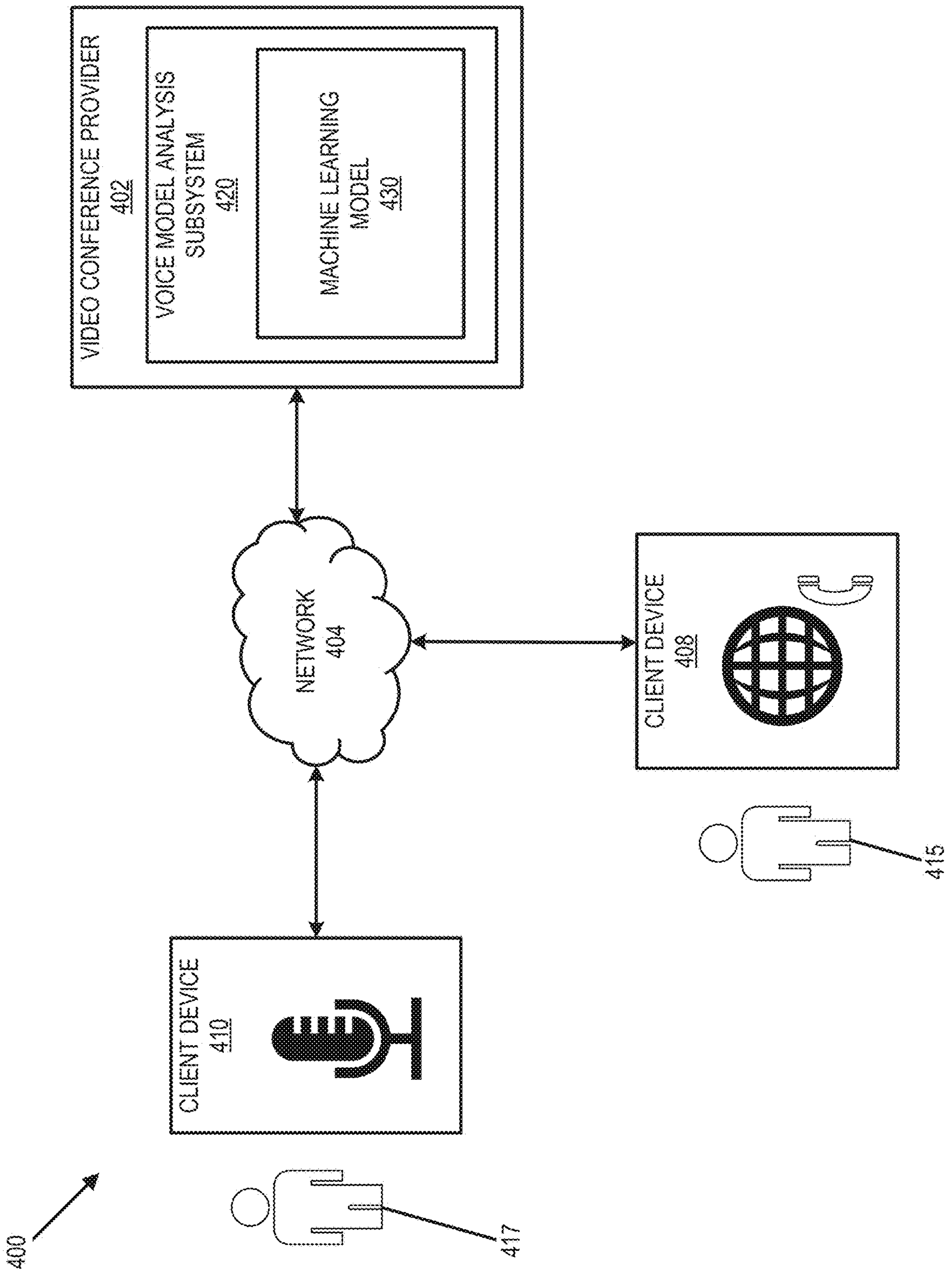
FIG. 4 shows an example of a system implementing audio authentication for digital telephony, according to some aspects of the present disclosure.

Referring now to FIG. 4, FIG. 4 shows an example of a system 400 implementing audio authentication for digital telephony. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately and cloud-hosted devices. Video conference provider 402 may be similar to the video conference providers 110, 210 described above with respect to FIGS. 1 and 2. For example, in some implementations, the video conference provider 402 includes a suite of services for the provision of video and voice services such as video conferencing, telephony, Voice over IP (VOIP), Public Switched Telephone Network (PSTN) integration, Interactive Voice Response (IVR) services, real-time messaging, session recording, and so on.

Client devices 408, 410 may be any type of device capable of executing the appropriate client software for audio authentication for digital telephony. For example, the client devices 408, 410 may be laptops, desktops, smartphones, tablets, internet protocol (IP) phones, and so on. The client devices 408, 410 may be network resources that are shared as in, for example, a co-working or hot-desking environment or a conference room. However, the method of authentication described herein can be used in any context where authentication is required.

In FIG. 4, client device 408 depicts an IP phone and client device 410 depicts a device with a connected speaker, such as a laptop. Client devices 408 and 410 may be used by users 415 and 417, respectively, for voice-based authentication. IP phones refer generally to devices that use the Internet Protocol to transmit and receive voice communications over a network, using, for example, the Voice over Internet Protocol (VOIP). IP phones may include mobile phones, cell phones, desk phones, conference room phones, unified communications devices (e.g., a Zoom Phone Appliance), and the like. In some examples, IP phones may include access to a suite of related services such as contacts, voicemail, integration with video conferencing software, and so on.

Video conference provider 402 includes a voice model analysis subsystem 420. The voice model analysis subsystem 420 includes components for, among other things, receiving voice samples, extracting features from voice samples, generating voice models based on extracted features, and comparing voice models. Voice model analysis subsystem 420 may also include artificial intelligence (AI) or machine learning (ML) components for comparing voice models that may generate faster or more accurate results when comparing voice models. For example, voice model analysis subsystem 420 includes ML model 430. ML model 430 may be trained for classification of a particular voice model or for predicting a likelihood that a particular voice model belongs to a particular source.

In a typical example, user 415 configures client device 408, such as an IP phone, by providing a voice sample (sometimes referred to as a voice print). The voice model analysis subsystem 420 extracts features from the voice sample and generates a voice model for user 415. In some examples, the voice model may be stored in a database for comparison with voice models generated during subsequent authentication attempts.

For subsequent uses of client device 408, user 415 need only provide a short voice sample, such as by speaking a particular passphrase. For example, the user 415 may pick up the handset of client device 418 or activate a speaker mode of client device 408. The user 415 may activate an interactive voice response (IVR) menu using a control such as a "softkey" on a graphical user interface (GUI). The client device 408 or IVR system may prompt the user 415 to speak a passphrase or answer a series of questions, which constitutes an authentication voice sample. The client device 408 can process the authentication voice sample and output the processed voice sample to the voice model analysis subsystem 420 of the video conference provider 402.

The voice model analysis subsystem 420 again extracts features and generates a voice model. The voice model analysis subsystem 420 applies a trained ML model 430 to predict the likelihood that the short sample matches the configured sample and grants authentication if the likelihood meets a predetermined threshold value (corresponding to a minimized difference). The predetermined threshold value may be configured to be high to maximize the confidence in the method of authentications.

Figure 5:
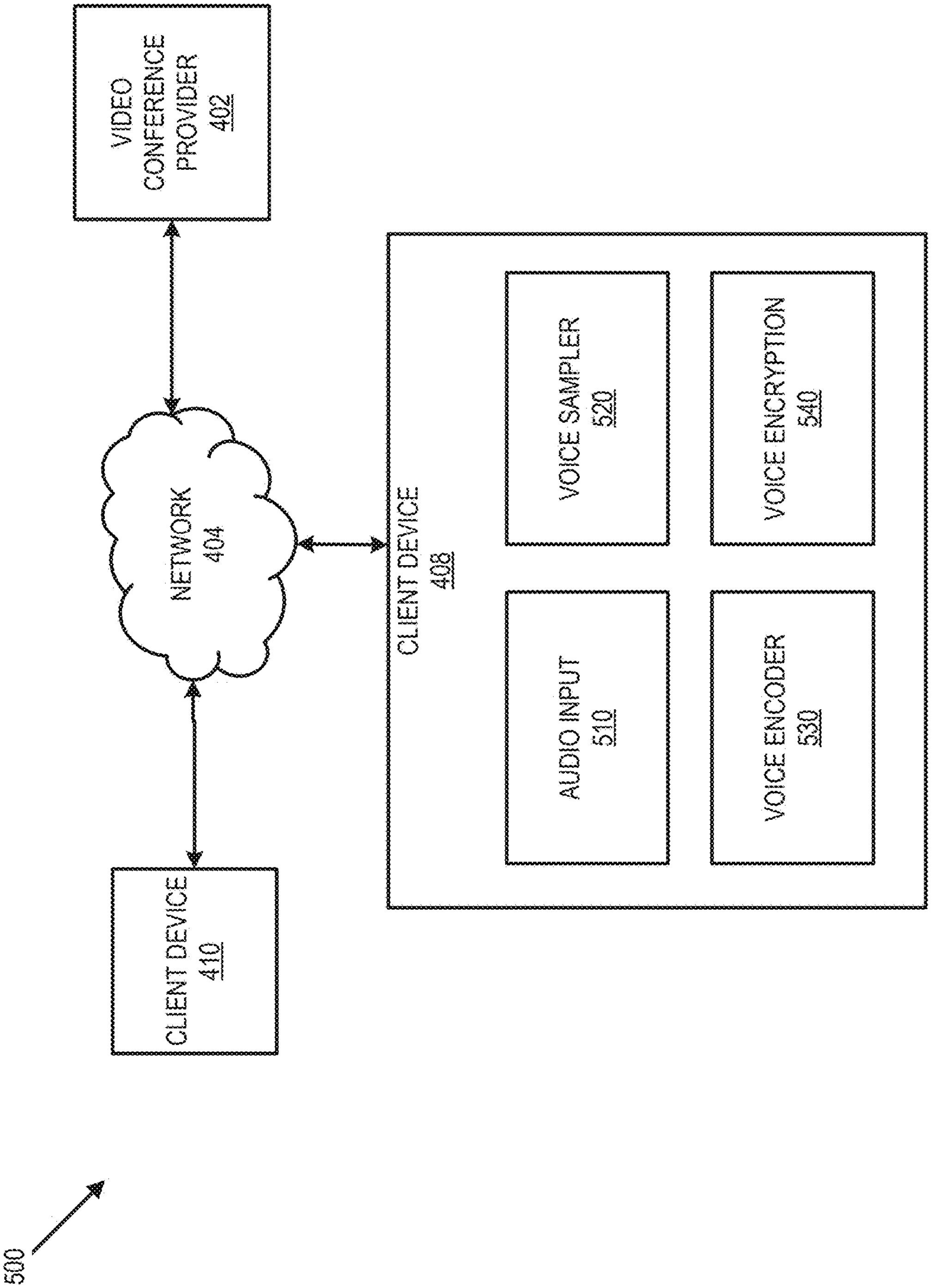
FIG. 5 shows a detail view of an example implementation of a client device that may be used in audio authentication for digital telephony, according to some aspects of the present disclosure.

FIG. 5 shows a detail view of an example implementation 500 of client device 408 that may be used in audio authentication for digital telephony. The example client device 408 includes components for voice sampling, encoding, and encryption/decryption functions, but these are just a possible configuration. For instance, in some examples, some or all of these functions may be instead included in the video conference provider 402 or other remote server.

The client device 408 includes an audio input device 510 such as an internal or external microphone. For example, audio input device 510 may be a built-in microphone included as part of the hardware making up the client device 408. In other examples, audio input device 510 may be an external microphone communicatively coupled to the client device 408. For instance, audio input device 510 may be a commercially available microphone that is connected to the client device with a physical connection (e.g., a wire) or wirelessly connected using WiFi, Bluetooth, etc. In the case where client device 408 is an IP phone, the audio input device 510 may be a microphone embedded within the IP phone such as mouthpiece on the phone handset.

The client device 408 includes a voice sampler 520. Voice sampler 520 captures analog audio signals from audio input device 510 and converts them into a digital format suitable for processing or transmission. For example, voice sampler 520 may include components such as an analog-to-digital converter (ADC) or a digital signal processor (DSP). The ADC can convert analog, continuous audio signal from the audio input device 510 into a digital signal. The DSP can be used for initial filtering of noise or to enhance specific features of the audio signal.

The client device 408 includes a voice encoder 530. The voice encoder 530 may be, for example, a codec (coder/decoder). A codec is a device or software module that encodes and decodes data. Encoding, in this context, refers the conversion of the digitized audio signal into a format suitable for efficient transmission, storage, or further processing. Typical codec implementations may include components such as quantizers, compression algorithms, or bitstream formatters. Voice encoder 530 may output the digitized, encoded voice sample in preparation for encryption or transmission to the video conference provider 402.

The robustness of generated voice models may be improved in proportion to the available data from voice samples. More data can be obtained by asking the user 415 to speak a specific phrase or sentence multiple times. Additional or more lengthy voice samples can improve the accuracy of the voice model analysis subsystem 420. Some examples may use wideband codecs (e.g., Opus) to collect high-quality audio samples. Wideband audio refers generally to an extended frequency range for capturing the human voice as compared with traditional systems.

The client device 408 includes a voice encryption component 540. The voice encryption component 540 may be used for secure transmission of the encoded voice sample to the video conference provider 402. In some examples, as in the case of IP phones, voice samples are encrypted using a cryptographic transport protocol such as the Secure Real-time Transport Protocol (SRTP). For other client devices 408, other encryption protocols such as Transport Layer Security (TLS) or Datagram Transport Layer Security (DTLS) may be utilized.

Following reception of a voice sample at audio input device 510 and processing by some or all of the components of example client device 408, the voice sample may be sent to video conference provider 402 over network 404 for feature extraction, development of a corresponding voice model, or comparison with stored voice models for providing voice-based authentication.

In some examples, additional layers of security may be used in addition to voice-based authentication. For example, the grant of authentication from the video conference provider 402 may also require, in addition to the voice sample, valid multi-factor authentication information. Multi-factor authentication information may include additional user credentials such as passwords or PINs, smart cards, hardware tokens, and so on. Multi-factor authentication may be used as a source of labels for continuous supervised training data, as described below with respect to the online training of ML model 430.

Figure 6:
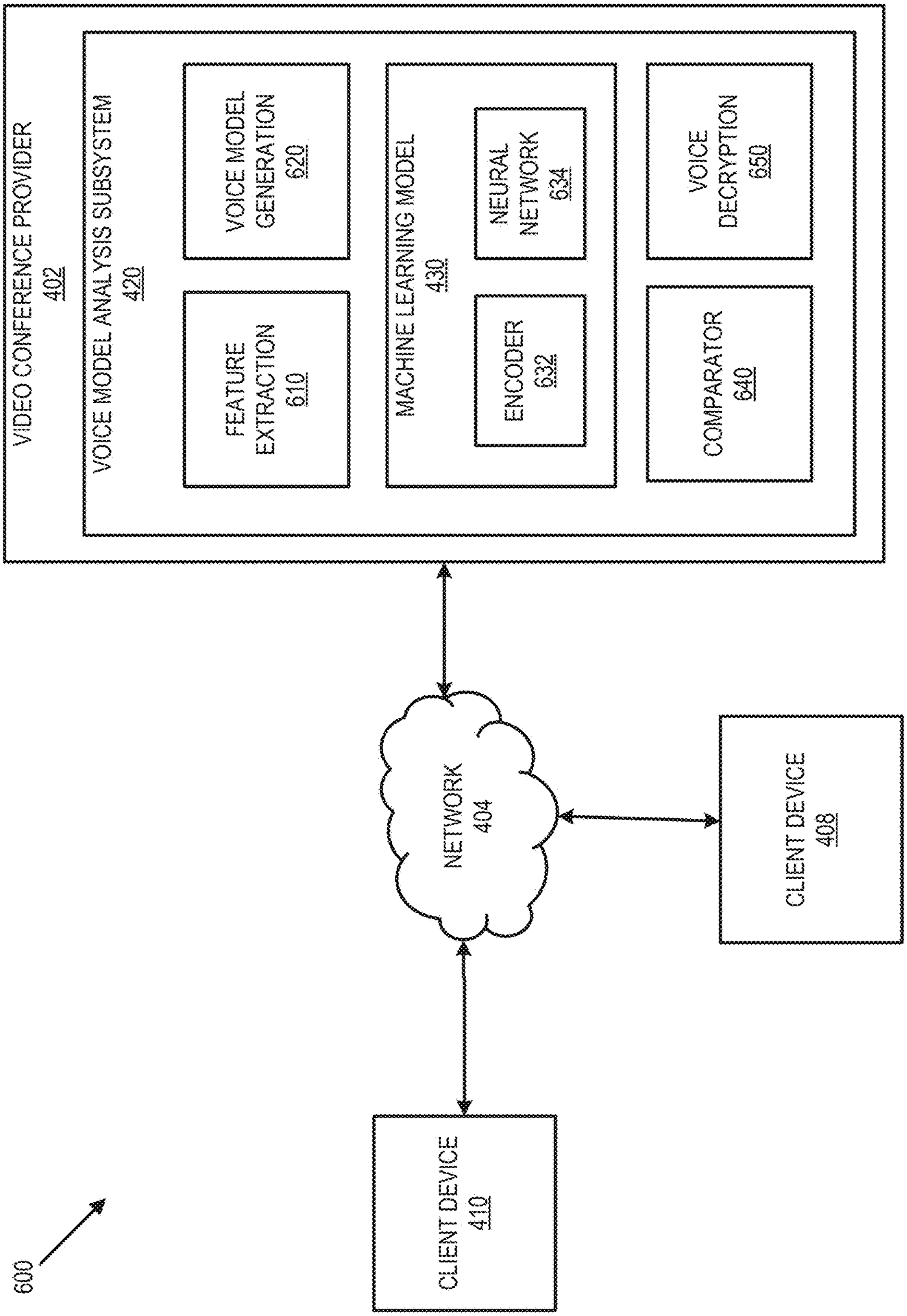
FIG. 6 shows an example implementation of the video conference provider as may be used in audio authentication for digital telephony, according to some aspects of the present disclosure.

FIG. 6 shows an example implementation 600 of the video conference provider 402 as may be used in audio authentication for digital telephony. In particular, the components of an example voice model analysis subsystem 420 are shown. Voice model analysis subsystem 420 includes a feature extraction component 610. Encoded audio information may be received from the client device 408 in a format suitable for processing.

Feature extraction component 610 can identify features from received voice samples such as pitch, tone, timbre, rhythm, pronunciation, speed, frequencies, spectral qualities, among others. In some examples, mathematical methods or algorithms may be applied to the voice sample to extract features. For instance, a Fast Fourier Transform (FFT) may be used to convert the time-domain voice sample into the frequency domain, from which features such as pitch and timbre can be more easily identified. Other example approaches include Mel Frequency Cepstral Coefficients (MFCCs), Linear Predictive Coding (LPC), and Wavelet Transform. The features extracted by feature extraction component 610 may be locally, ephemerally stored in a suitable digital format in preparation for allocation to a voice model.

Voice model generation component 620 can collect extracted features and associate them with a particular user voice model. For example, during configuration, a user voice sample may be supplied to generate the initial voice model against which future authentication attempts will be judged. Voice model generation component 620 may be configured to add features extracted by feature extraction component 610 to a new voice model as well as to update an existing voice model with additional features or features re-extracted with greater fidelity.

Voice model generation component 620 may apply a threshold number or quality of features for generation of a voice model. For instance, given an initial voice sample with noise or music playing in the background, it may not be possible to extract sufficient features or features with enough confidence to generate a user voice profile. In these cases, it may be necessary to repeat the initial configuration process.

Once a voice model is generated for a user, subsequent voice samples can be provided for authentication. A difference between the initially provided user voice model and the voice model created during authentication attempts is used to determine whether to grant authentication. In some examples, a trained machine learning (ML) model 430 may be used to determine the difference. The trained ML model 430 can be trained to generate a probability that the voice model associated with an authentication attempt is the same as the model based on the user's voice. Based on this prediction, the trained ML model 430 can provide a classification of the voice model for the authentication attempt as valid or not valid. An affirmative classification or high probability (or confidence therein) corresponds generally to a low or minimized difference.

The ML model 430 (or combination of models) used by voice model analysis subsystem 420 can include models trained using a suitable supervised, semi-supervised, or unsupervised training technique. For example, a neural network 634 could be trained using supervised training methods, including training data consisting of labeled pairs of voice models, to learn underlying patterns and relationships and enabling functions such as prediction and classification for new, unseen examples. Likewise, unsupervised training data drawn from unlabeled voice models can be used to identify hidden structures or patterns through techniques such as clustering or dimensionality reduction, thereby surfacing trends and insights from otherwise unstructured and disparate datasets.

In some examples, the trained ML model 430 may include a deep neural network 634 including convolutional neural network (CNN) layers for feature extraction, gated recurrent unit (GRU) or Long Short-Term Memory (LSTM) layers for time information synthetic, and fully connected layers as classifiers. Other layers can also be used including, for example, attention layers, auto-pooling layers, and so on. Any suitable machine learning model may be used according to different examples, such as linear regression, logistic regression, decision trees, random forests, gradient boosting machines (GBM), support vector machines (SVM), naive Bayes, k-nearest neighbors (KNN), recurrent neural networks (RNN), XGBoost, AdaBoost, and gaussian processes. Further, some examples may employ adversarial networks, such as generative adversarial networks (GANs) while others may employ autoencoders (AEs). Several variations among AEs may be found, including variational AEs (VAEs) or conditional VAEs (CVAEs). GANs and AEs may be used in conjunction in configurations such as AEGANs or variational AEGANs (VAEGANs). Accordingly, the example ML model 430 as depicted in FIG. 6 includes neural network 634, but one of ordinary skill in the art will appreciate that ML model 430 may include any number of other components necessary for the implementation of the particular ML model in use for prediction, classification, etc.

ML model 430 includes an encoder 632. Encoder 632 may be a ML model component for conversion of the user model into a format suitable for processing by ML model 430. Encoder 632 may be, for example, an autoencoder, a transformer-based encoder like the one used in Bidirectional Encoder Representations from Transformers (BERT), or a convolutional neural network (CNN) encoder layer designed for sequential data. In some examples, encoder 632 can be used to generate an embedded representation of the voice model generated from the initial voice sample and the voice models developed from subsequent voice samples associated with authentication attempts. In this context, embedded representation may refer to a lower-dimensional representation of the voice model that is suitable for processing by the components of ML model 430. For instance, the encoder 632 may encode a voice model to a multi-dimension vector representation.

In some examples, the trained ML model 430 can be further trained based on the accuracy of classifications of the user voice model and the authentication voice model pairs. For example, in cases where predictions are less than a required threshold, but authentication is nevertheless indicated according to other indicia, such as multi-factor authentication, such "near misses" can be used to adjust the parameters of the ML model 430. If a component of the ML model 430 is, for example, a neural network 634, these and other inferred confirmations or disconfirmations of predictions or classifications can be used to update the weights or other parameters of the neural network 634. Other sources of labeled or pseudo-labeled training data may be used to support online or continuous training of the ML model 430.

Voice model analysis subsystem 420 includes comparator 640. The comparator 640 includes components for determining a difference between the voice models, such as the user voice model supplied during initial configuration and the voice model developed during subsequent authentication attempts. In some examples, determining the difference between the user voice model and the authentication voice model further may include determining a metric characterizing a vector space relationship between the embedded representation of the user voice sample and the embedded representation of the authentication voice sample. For example, the encoder 632 may generate a vector representation of a pair of voice models for comparison. Their difference may be determined using measures such as Euclidean distance, cosine similarity, dot product, and so on.

Comparator 640 may also be used for comparing the predictions or classifications of ML model 430 to predefined thresholds for determining valid authentication attempts. For instance, a predefined threshold of 95% confidence may be the minimum difference between voice models required for a successful authentication attempt. Probabilities may be directly compared, but ML model 430 may output other measures of confidence that can be mapped to the appropriate scale. Likewise, comparator 640 can map the vector measures of similarity described above to the predefined threshold. For example, a cosine similarity (e.g., the cosine of the angle between two vector representations of voice models) of 0.8 may be associated with the predefined threshold of 95% confidence according to a suitable mapping.

Voice model analysis subsystem 420 includes a voice decryption component 650. The voice decryption component 650 may be used for decryption of the secure transmission of the voice encoded voice sample received from client device 408. For example, in the case of IP phones, voice samples are encrypted using a cryptographic transport protocol such as the Secure Real-time Transport Protocol (SRTP).

SRTP and similar secure transport protocols can add an encryption layer on top of underlying transport protocols. SRTP relies on symmetric keys that can be located on both of the client device 408 or voice decryption component 650. For example, the keys may be generated at the beginning of the session or pre-established between the IP phone device and the voice decryption component 650 during installation of the IP phone. The voice decryption component 650 may include components for key generation and establishing and maintaining secure sessions during voice-based authentication.

Referring now to FIG. 7, FIG. 7 shows a flowchart of an example method 700 for audio authentication for digital telephony. The description of the method 700 in FIG. 7 will be made with reference to FIGS. 4-6, however any suitable system according to this disclosure may be used, such as the example systems 100 and 200, shown in FIGS. 1 and 2.

It should be appreciated that method 700 provides a particular method for providing audio authentication for digital telephony. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. For example, the description is given from the perspective of the video conference provider 402 but other configurations are possible. One of ordinary skill in the art would recognize many variations, modifications, and alternatives.

The method 700 may include block 702. At block 702, video conference provider 402 receives a user voice sample to initiate a configuration process. For example, the client device 408, such as an IP phone, may receive an initial voice sample through the audio input device 510 via voice sampler 520, as described in FIG. 5 and the accompanying description. The sampled voice may be processed by the voice encoder 530 and encrypted using a suitable transport protocol using voice encryption component 540. The voice sample may be sent to video conference provider 402 by client device 408 using an application programming interface (API) such as a web-based API or a connectionless protocol such as the user datagram protocol (UDP).

In some examples, including examples where the client device 408 is an IP phone, the user voice sample and other voice samples used herein can be received using an interactive voice response (IVR) system. IVR systems may include systems that enable user interaction with a computerized system through the use of voice commands or key-based inputs (e.g., an IP phone keypad). The IVR system typically provides pre-recorded voice responses to guide the user, process their input, and route calls based on the user's selection or input. For instance, the IVR system may guide the user to provide an initial voice sample and to provide subsequent voice samples for authentication.

At block 704, video conference provider 402 determines one or more user voice features from the user voice sample. For example, feature extraction component 610 can identify features from received voice samples such as pitch, tone, timbre, rhythm, pronunciation, speed, frequencies, spectral qualities, as well as apply mathematical models to determine coefficients or parameters that may characterize the voice sample. For example, Mel Frequency Cepstral Coefficients (MFCCs) can be computed from the voice sample to provide a compact representation of the voice sample's spectral characteristics. The features extracted by feature extraction component 610 may be locally, ephemerally stored in a suitable digital format in preparation for allocation to a voice model. For example, extracted feature information may be stored as arrays or vectors of floating-point numbers using a memory device like a filesystem or in-memory cache.

At block 706, video conference provider 402 generates a user voice model based on the one or more user voice features. The user voice model includes a collection of extracted features that characterize a particular voice according to a predetermined threshold. The threshold may specify certain minimum required features or quality of features. In the event insufficient voice sample is available to generate a user voice model, the initial voice sample may need to be repeated as in block 702. The generated user voice model may be stored as collections of arrays or vectors of floating-point numbers using a memory device like a filesystem or in-memory cache.

At block 708, video conference provider 402 receives, from a client device, first authentication information comprising an authentication voice sample. With the initial voice sample received and baseline voice model generated and stored, the client device 408 can be used for voice-based authentication. In an example in which the client device 408 is an IP phone, the user may desire to use the IP phone and pick up the handset. An IVR system may provide a prompt, specifying a particular short word or phrase to be spoken. The IVR system may be configured to minimize the amount of time the authentication process takes. In some examples, the authenticating user need not wait for the IVR system and can immediately speak the known word or phrase.

At block 710, video conference provider 402 determines one or more authentication voice features from the authentication voice sample. As in block 704, a number of features can be determined from the authentication voice sample. Because the authentication voice sample is shorter and may be spoken rapidly or repeatedly, fewer or different features may be available for extraction as compared with the initial voice sample. Thus, the phrases chosen for the initial voice sample and the authentication voice sample may be similar or may be chosen to evoke similar voice features to ensure comparable voice models.

At block 712, video conference provider 402 generates an authentication voice model based on the one or more authentication voice features. As in block 706, the authentication voice model includes a collection of extracted features that characterize a particular voice according to a predetermined threshold determined in block 710. In some examples, the voice model analysis subsystem 420 as described in the description accompanying FIG. 4 may be configured to generate the authentication voice model as quickly as possible so that the authentication process proceeds with minimal or imperceptible delay.

For example, the initial user voice model may be stored on a hard drive or filesystem, while the authentication voice models may be generated and ephemerally stored in memory to minimize the time for the authentication process. Likewise, user voice model, while persistently stored on disk, can be cached in-memory for a period of time following an authentication session to speed up subsequent uses.

At block 714, video conference provider 402 determines a difference between the user voice model and the authentication voice model. The difference may be determined using an arithmetic operation such as subtraction or division. In some examples, the voice models may be converted into a suitable vector representation by encoder 632 as shown in FIG. 6 and the accompanying description. The difference in that case may be given by a geometrical measure such as the Euclidean distance or the cosine similarity. In some examples, an ML model 430 may be used to make predictions and/or classifications about the relationship between voice model pairs. In that case, the difference between the user voice model and the authentication voice model may be defined as a likelihood that they do not have the same source or the outcome of a classification operation. In all cases, the difference may be compared with a predetermined threshold that may be a numerical maximum or minimum, or qualitative output such as a particular classification, according to the comparison implemented in comparator 640.

At block 716, video conference provider 402, responsive to the difference being less than a predetermined threshold, outputs, to the client device 408, an authentication grant. For example, if the ML model 430 predicts a 4% chance that the user voice model and the authentication voice model are generated from different sources and the predetermined threshold is 5%, then an authentication grant may be generated.

The authentication grant may include persisting information about a newly created session in a database or other memory device and the generation of suitable tokens, keys, cookies, and so forth. The authentication grant may be returned to the client device 408 using a formatted response, such as a JavaScript Object Notation (JSON) object. The client device 408 may in turn use the grant in subsequent communications as evidence of the granted authentication. For example, an IP phone may include an authentication grant token in packets making up a telephony conversation in a format such as a JSON Web Token (JWT).

Figure 8:
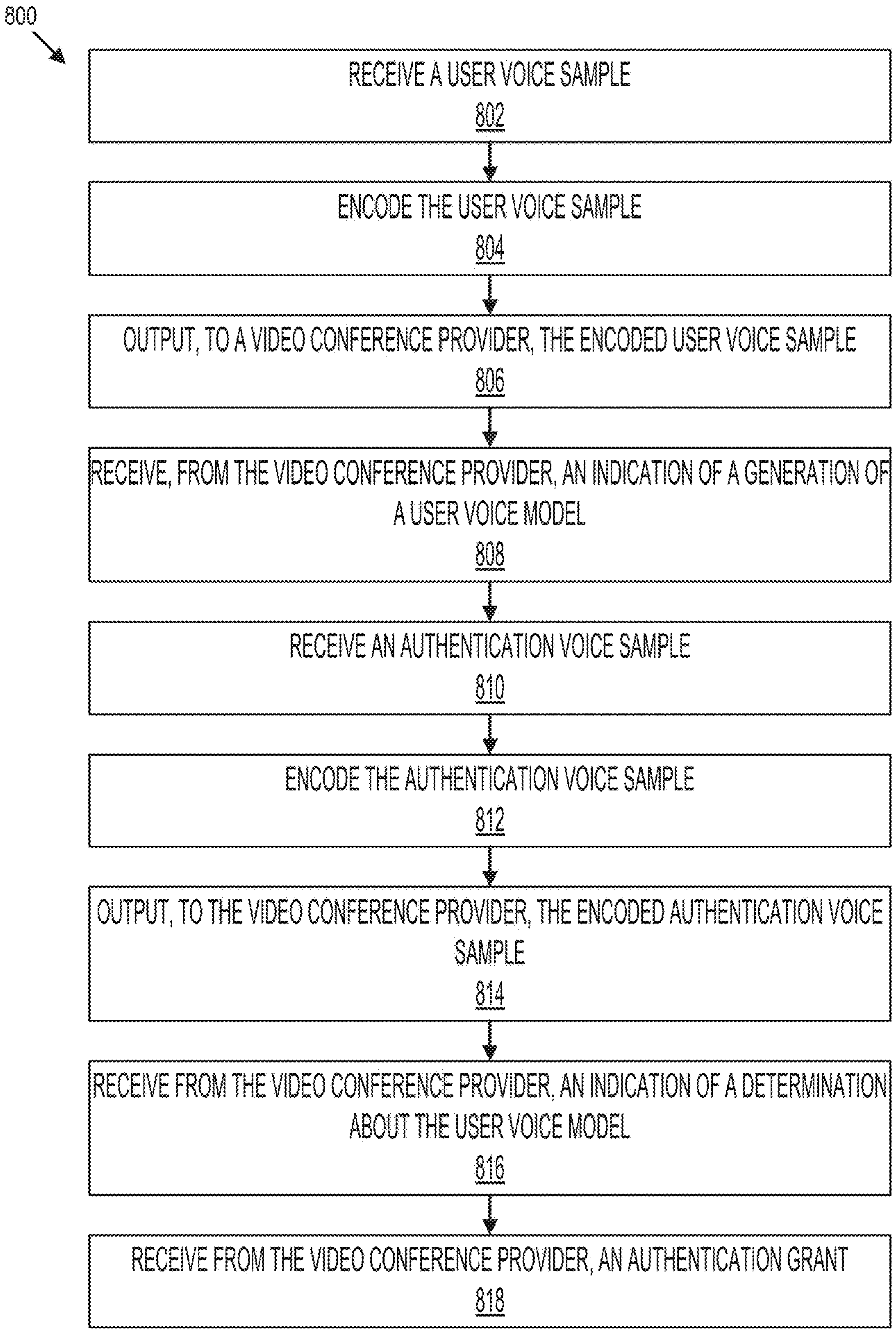
FIG. 8 shows a flowchart of an example method as may be used in audio authentication for digital telephony, according to some aspects of the present disclosure.

Referring now to FIG. 8, FIG. 8 shows a flowchart of an example method 800 as may be used in audio authentication for digital telephony. The description of the method 800 in FIG. 8 will be made with reference to FIGS. 4-6, however any suitable system according to this disclosure may be used, such as the example systems 100 and 200, shown in FIGS. 1 and 2.

It should be appreciated that method 800 provides a particular method for providing audio authentication for digital telephony. Other sequences of operations may also be performed according to alternative examples. For example, alternative examples of the present disclosure may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. For example, the description is given from the perspective of the client device 408 but other configurations are possible. One of ordinary skill in the art would recognize many variations, modifications, and alternatives.

The method 800 may include block 802. At block 802, client device 408 receives a user voice sample. For example, the voice sample may be received by way of a microphone or other audio input device 510. The voice sample may be provided in response to an IVR system or prompt provided by component of the client device 408 itself. For example, the client device 408 may include a component for prompting the user to configure voice-based authentication or to provide voice samples for voice-based authentication after it has been configured.

At block 804, client device 408 encodes the user voice sample. As in block 702, the client device 408, such as an IP phone, can process the voice sample using voice encoder 530 and encrypt the voice sample using a suitable transport protocol using voice encryption component 540, as shown and described in FIG. 5 and the accompanying description.

At block 806, client device 408 outputs, to a video conference provider 402, the encoded user voice sample. For example, the voice sample may be sent to video conference provider 402 by client device 408 using an application programming interface (API) such as a web-based API or a connectionless protocol such as the user datagram protocol (UDP).

At block 808, client device 408 receives, from the video conference provider 402, an indication of the generation of a user voice model. As described above in the description of block 706, the video conference provider 402 may successfully generate a user voice model based on an initially provided voice sample during a configuration process. A message may be returned to the client device 408 indicating that the user voice model has been successfully generated and that voice-based authentication may be used. The message may take suitable forms such as an email, text message, phone call, or electronic indication to the client device 408 that can be displayed on a user interface (UI) or graphical user interface (GUI) of the client device 408. For example, the client device 408 may include a display device that shows menus and context-dependent soft keys and outputs according to context.

At block 810, client device 408 receives an authentication voice sample. With the initial voice sample received and baseline voice model generated and stored, the client device 408 can be used for voice-based authentication. The client device 408 provides a prompt to the user to input a word or passphrase, such as "Please say 'voice key' to continue" or "For authentication, repeat the phrase 'authenticate me.'" The words or passphrases may be chosen to reproduce the features extracted from the voice sample in block 802. Thus, the choice of phrase for the initial voice sample and the subsequent authentication samples may be chosen to complement each other with respect to the voice features likely to be extracted.

At block 812, client device 408 encodes the authentication voice sample. Again, as in block 702, the client device 408, such as an IP phone, can process the voice sample using voice encoder 530 and encrypt the voice sample using a suitable transport protocol using voice encryption component 540.

At block 814, client device 408 outputs, to the video conference provider, the encoded authentication voice sample. For example, the authentication voice sample may be sent to video conference provider 402 by client device 408 using an application programming interface (API) such as a web-based API or a connectionless protocol such as the user datagram protocol (UDP).

At block 816, client device 408 receives, from the video conference provider 402, an indication of a determination that the user voice model and an authentication voice model are less different than a predetermined threshold. For instance, the client device 408 may receive a message indicating that voice-based authentication has been successful. The message may take any suitable form including TCP/IP packet, email, phone call, message, and so on. In some examples, the client device 408 may include UI features for communicating a successful authentication to the user. For example, a client device 408 may include a configuration of colored lights indicating the status of the authentication session. In another example, the client device 408 may include a display device that can display the current status of the authentication process or session.

At block 818, client device 408 receives, from the video conference provider 402, an authentication grant. As in block 716, the authentication grant may be a token, API keys, cookies, password, cryptographic key, and so on. The client device 408 may in turn use the grant in subsequent communications as evidence of the granted authentication. For example, an IP phone may include an authentication grant token in subsequent requests sent to a web API. For instance, the token may be included as an HTTP header, query parameter, form parameter, and so on. The authentication grant may include an expiration time and date, information about grant scope, or other metadata.

Figure 9:
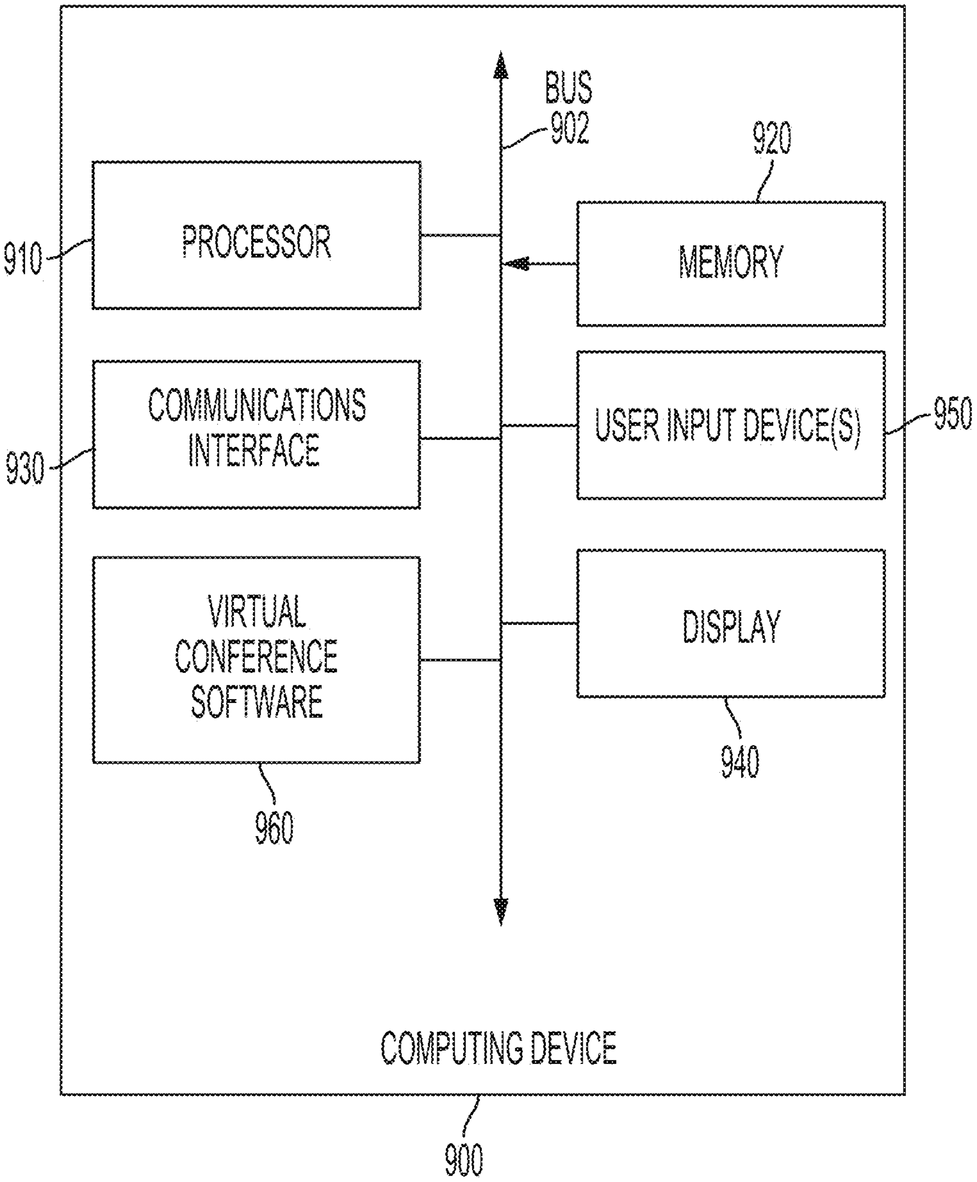
FIG. 9 shows an example computing device suitable for use in example systems or methods for providing audio authentication for digital telephony, according to some aspects of the present disclosure.

Referring now to FIG. 9, FIG. 9 shows an example computing device 900 suitable for use in example systems or methods for providing audio authentication for digital telephony according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for audio authentication for digital telephony according to different examples, such as part or all of the example methods 700, 800 described above with respect to FIGS. 7 and 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes virtual conferencing software 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving a user voice sample; determining one or more user voice features from the user voice sample; generating a user voice model based on the one or more user voice features; receiving, from a client device, first authentication information comprising an authentication voice sample; determining one or more authentication voice features from the authentication voice sample; generating an authentication voice model based on the one or more authentication voice features; determining a difference between the user voice model and the authentication voice model; and responsive to the difference being less than a predetermined threshold, outputting, to the client device, an authentication grant.

Example 2 is the method of example(s) 1, wherein the user voice sample and the authentication voice sample are encoded using a codec.

Example 3 is the method of example(s) 1, wherein the client device is an Internet Protocol (IP) telephony device.

Example 4 is the method of example(s) 3, wherein the user voice sample and the authentication voice sample are received using an interactive voice response (IVR) system.

Example 5 is the method of example(s) 1, wherein determining the difference between the user voice model and the authentication voice model comprises generating an embedded representation of the user voice sample and an embedded representation of the authentication voice sample.

Example 6 is the method of example(s) 5, wherein determining the difference between the user voice model and the authentication voice model further comprises determining a metric characterizing a vector space relationship between the embedded representation of the user voice sample and the embedded representation of the authentication voice sample.

Example 7 is the method of example(s) 1, wherein determining the difference between the user voice model and the authentication voice model further comprises: inputting the user voice model and the authentication voice model to a trained machine learning model, the trained machine learning model trained to generate a probability that an input voice model pair are based on the user's voice; and receiving, from the trained machine learning model, a classification of the user voice model and authentication voice model pair.

Example 8 is the method of example(s) 7, wherein the trained machine learning model is further trained based on the classification of the user voice model and the authentication voice model pair.

Example 9 is the method of example(s) 1, wherein the one or more user voice features and the one or more authentication voice features comprise one or more of pitch, tone, timbre, rhythm, or pronunciation.

Example 10 is the method of example(s) 1, wherein outputting, to the client device, the authentication grant is further responsive to receiving, from the client device, valid multi-factor authentication information.

Example 11 is the method of example(s) 1, wherein the user voice sample and the authentication voice sample are encrypted using a cryptographic transport protocol.

Example 12 is the method of example(s) 11, wherein the cryptographic transport protocol is the Secure Real-time Transport Protocol (SRTP).

Example 13 is a non-transitory computer-readable medium storing instructions that, when executed by one or more processors, cause the one or more processors to perform operations including: receiving a user voice sample; determining one or more user voice features from the user voice sample; generating a user voice model based on the one or more user voice features; receiving, from a client device, first authentication information comprising an authentication voice sample; determining one or more authentication voice features from the authentication voice sample; generating an authentication voice model based on the one or more authentication voice features; determining a difference between the user voice model and the authentication voice model; and responsive to the difference being less than a predetermined threshold, outputting, to the client device, an authentication grant.

Example 14 is the non-transitory computer-readable medium of example(s) 13, wherein the client device is an Internet Protocol (IP) telephony device.

Example 15 is the non-transitory computer-readable medium of example(s) 13, wherein determining the difference between the user voice model and the authentication voice model further comprises: inputting the user voice model and the authentication voice model to a trained machine learning model, the trained machine learning model trained to generate a probability that an input voice model pair are based on the user's voice; and receiving, from the trained machine learning model, a classification of the user voice model and authentication voice model pair.

Example 16 is the non-transitory computer-readable medium of example(s) 15, wherein the trained machine learning model is further trained based on the classification of the user voice model and the authentication voice model pair.

Example 17 is a system comprising: one or more processors; and one or more computer-readable storage media storing instructions which, when executed by the one or more processors, cause the one or more processors to perform operations including: receiving a user voice sample; determining one or more user voice features from the user voice sample; generating a user voice model based on the one or more user voice features; receiving, from a client device, first authentication information comprising an authentication voice sample; determining one or more authentication voice features from the authentication voice sample; generating an authentication voice model based on the one or more authentication voice features; determining a difference between the user voice model and the authentication voice model; and responsive to the difference being less than a predetermined threshold, outputting, to the client device, an authentication grant.

Example 18 is the system of example(s) 17, wherein the client device is an Internet Protocol (IP) telephony device.

Example 19 is the system of example(s) 17, wherein determining the difference between the user voice model and the authentication voice model further comprises: inputting the user voice model and the authentication voice model to a trained machine learning model, the trained machine learning model trained to generate a probability that an input voice model pair are based on the user's voice; and receiving, from the trained machine learning model, a classification of the user voice model and authentication voice model pair.

Example 20 is the system of example(s) 17, wherein the one or more user voice features and the one or more authentication voice features comprise one or more of pitch, tone, timbre, rhythm, or pronunciation.

That which is claimed is:

1. A method, comprising:

receiving a user voice sample;

determining user voice features from the user voice sample;

determining that a number of user voice features exceeds a threshold number of features;

responsive to determining that the number of user voice features exceeds the threshold number of features, generating a user voice model based on the one or more user voice features;

caching the user voice model in an in-memory cache;

receiving, from a client device, first authentication information comprising an authentication voice sample;

determining one or more authentication voice features from the authentication voice sample;

generating an authentication voice model based on the one or more authentication voice features;

retrieving the user voice model from the in-memory cache;

determining a difference between the user voice model and the authentication voice model, comprising:

determining an embedded representation of the user voice sample and an embedded representation of the authentication voice sample, wherein the embedded representation of the user voice sample and the embedded representation of the authentication voice sample each comprise a multi-dimensional vector;

determining a metric characterizing a vector space relationship between the embedded representation of the user voice sample and the embedded representation of the authentication voice sample; and comparing the metric to a predetermined threshold that is mapped to a numerical probability that the user voice model does not differ from the authentication voice sample; and responsive to the difference being less than the predetermined threshold, outputting, to the client device, an authentication grant.

2. The method of claim 1, wherein the user voice sample and the authentication voice sample are encoded using a codec.

3. The method of claim 1, wherein the client device is an Internet Protocol (IP) telephony device.

4. The method of claim 3, wherein the user voice sample and the authentication voice sample are received using an interactive voice response (IVR) system.

5. The method of claim 1, wherein determining the difference between the user voice model and the authentication voice model further comprises:

inputting the user voice model and the authentication voice model to a trained machine learning model, the trained machine learning model trained to generate a probability that an input voice model pair are based on the user's voice; and receiving, from the trained machine learning model, a classification of the user voice model and authentication voice model pair.

6. The method of claim 5, wherein the trained machine learning model is further trained based on the classification of the user voice model and the authentication voice model pair.

7. The method of claim 1, wherein the one or more user voice features and the one or more authentication voice features comprise one or more of pitch, tone, timbre, rhythm, or pronunciation.

8. The method of claim 1, wherein outputting, to the client device, the authentication grant is further responsive to receiving, from the client device, valid multi-factor authentication information.

9. The method of claim 1, wherein the user voice sample and the authentication voice sample are encrypted using a cryptographic transport protocol.

10. The method of claim 9, wherein the cryptographic transport protocol is the Secure Real-time Transport Protocol (SRTP).

11. A non-transitory computer-readable medium storing instructions that, when executed by one or more processors, cause the one or more processors to perform operations including:

receiving a user voice sample;

determining user voice features from the user voice sample;

determining that a number of user voice features exceeds a threshold number of features;

responsive to determining that the number of user voice features exceeds the threshold number of features, generating a user voice model based on the one or more user voice features;

caching the user voice model in an in-memory cache;

receiving, from a client device, first authentication information comprising an authentication voice sample;

determining one or more authentication voice features from the authentication voice sample;

generating an authentication voice model based on the one or more authentication voice features;

retrieving the user voice model from the in-memory cache;

determining a difference between the user voice model and the authentication voice model, comprising:

determining an embedded representation of the user voice sample and an embedded representation of the authentication voice sample, wherein the embedded representation of the user voice sample and the embedded representation of the authentication voice sample each comprise a multi-dimensional vector;

determining a metric characterizing a vector space relationship between the embedded representation of the user voice sample and the embedded representation of the authentication voice sample; and comparing the metric to a predetermined threshold that is mapped to a numerical probability that the user voice model does not differ from the authentication voice sample; and responsive to the difference being less than the predetermined threshold, outputting, to the client device, an authentication grant.

12. The non-transitory computer-readable medium of claim 11, wherein the client device is an Internet Protocol (IP) telephony device.

13. The non-transitory computer-readable medium of claim 11, wherein determining the difference between the user voice model and the authentication voice model further comprises:

inputting the user voice model and the authentication voice model to a trained machine learning model, the trained machine learning model trained to generate a probability that an input voice model pair are based on the user's voice; and receiving, from the trained machine learning model, a classification of the user voice model and authentication voice model pair.

14. The non-transitory computer-readable medium of claim 13, wherein the trained machine learning model is further trained based on the classification of the user voice model and the authentication voice model pair.

15. A system comprising:

one or more processors; and one or more computer-readable storage media storing instructions which, when executed by the one or more processors, cause the one or more processors to perform operations including:

receiving a user voice sample;

determining user voice features from the user voice sample;

determining that a number of user voice features exceeds a threshold number of features;

responsive to determining that the number of user voice features exceeds the threshold number of features, generating a user voice model based on the one or more user voice features;

caching the user voice model in an in-memory cache;

receiving, from a client device, first authentication information comprising an authentication voice sample;

determining one or more authentication voice features from the authentication voice sample;

generating an authentication voice model based on the one or more authentication voice features;

retrieving the user voice model from the in-memory cache;

determining a difference between the user voice model and the authentication voice model, comprising:

determining an embedded representation of the user voice sample and an embedded representation of the authentication voice sample, wherein the embedded representation of the user voice sample and the embedded representation of the authentication voice sample each comprise a multi-dimensional vector;

determining a metric characterizing a vector space relationship between the embedded representation of the user voice sample and the embedded representation of the authentication voice sample; and comparing the metric to a predetermined threshold that is based on a numerical probability that the user voice model does not differ from the authentication voice sample; and responsive to the difference being less than the predetermined threshold, outputting, to the client device, an authentication grant.

16. The system of claim 15, wherein the client device is an Internet Protocol (IP) telephony device.

17. The system of claim 15, wherein determining the difference between the user voice model and the authentication voice model further comprises:

inputting the user voice model and the authentication voice model to a trained machine learning model, the trained machine learning model trained to generate a probability that an input voice model pair are based on the user's voice; and receiving, from the trained machine learning model, a classification of the user voice model and authentication voice model pair.

18. The system of claim 15, wherein the one or more user voice features and the one or more authentication voice features comprise one or more of pitch, tone, timbre, rhythm, or pronunciation.

19. The method of claim 1, wherein the metric is one of the Euclidean distance, the cosine similarity, or the dot product between the embedded representation of the user voice sample and the embedded representation of the authentication voice sample.

20. The method of claim 4, wherein:

receiving the user voice sample comprises configuring the IVR system, comprising:

providing a first voice prompt requesting the user voice sample via the IVR system; and receiving the user voice sample in response to the first voice prompt; and receiving, from the client device, the first authentication information comprising the authentication voice sample comprises:

providing a second voice prompt requesting the authentication voice sample via the IVR system; and receiving the authentication voice sample in response to the second voice prompt.

* * * * *